US009724771B2

(12) United States Patent
Aoki et al.

(10) Patent No.: US 9,724,771 B2
(45) Date of Patent: Aug. 8, 2017

(54) RECIPROCATING POWER TOOL

(75) Inventors: Yonosuke Aoki, Anjo (JP); Shinji Hirabayashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 1094 days.

(21) Appl. No.: 13/155,089

(22) Filed: Jun. 7, 2011

(65) Prior Publication Data
US 2012/0192438 A1    Aug. 2, 2012

Related U.S. Application Data

(60) Provisional application No. 61/437,930, filed on Jan. 31, 2011.

(51) Int. Cl.
*B23D 51/16* (2006.01)
*B23D 49/16* (2006.01)

(52) U.S. Cl.
CPC .......... *B23D 51/16* (2013.01); *B23D 49/165* (2013.01)

(58) Field of Classification Search
USPC ............ 30/371, 309, 318; 74/602–604, 595; 173/213, 216, 109, 104, 595
See application file for complete search history.

(56) References Cited

U.S. PATENT DOCUMENTS

| | | | | | |
|---|---|---|---|---|---|
| 2,240,755 | A | * | 5/1941 | Briggs | 30/394 |
| 2,428,924 | A | * | 10/1947 | Albertson | 74/604 |
| 2,610,524 | A | * | 9/1952 | Maust | B30B 15/0064 74/589 |
| 2,769,297 | A | * | 11/1956 | Orelind et al. | 56/306 |
| 2,808,696 | A | * | 10/1957 | Hall | 56/296 |
| 3,370,859 | A | * | 2/1968 | Milton et al. | 279/119 |
| 3,457,796 | A | * | 7/1969 | De Waters et al. | 74/50 |
| 4,438,343 | A | * | 3/1984 | Marken | 290/53 |

(Continued)

FOREIGN PATENT DOCUMENTS

JP    A-2005-14111    1/2005

*Primary Examiner* — Andrea Wellington
*Assistant Examiner* — Fernando Ayala
(74) *Attorney, Agent, or Firm* — Oliff PLC

(57) ABSTRACT

It is an object of the invention to provide a technique for reducing vibration by counter weights which smoothly operate without linearly reciprocating, in a reciprocating power tool.

The reciprocating power tool has first and second bevel gears 123, 147 which are opposed to each other on either side of a pinion 119 and rotationally driven in opposite directions at the same reduction ratio by the pinion 119. Further, the reciprocating power tool has a slider 107 which is caused to linearly reciprocate in a longitudinal direction of a tool bit 111 by a crank 129. The first and second bevel gears 123, 147 are provided with first and second counter weights 143, 145 in positions displaced from their rotation axes, respectively. When the first counter weight 143 and the second counter weight 145 revolve, components of the revolving motion in the longitudinal direction of the tool bit oppositely move with respect to linear motion of the slider 107, and the first counter weight 143 and the second counter weight 145 move in the same phase in the longitudinal direction of the tool bit 111 and are disposed on opposite sides of the rotation axis and at the same distance from the rotation axis in a direction transverse to the longitudinal direction of the tool bit 111.

10 Claims, 10 Drawing Sheets

(56) References Cited

U.S. PATENT DOCUMENTS

| | | | |
|---|---|---|---|
| 4,545,123 A * | 10/1985 | Hartmann | 30/393 |
| 5,099,705 A * | 3/1992 | Dravnieks | 74/50 |
| 5,134,777 A * | 8/1992 | Meyer et al. | 30/392 |
| 5,212,887 A * | 5/1993 | Farmerie | 30/393 |
| 6,286,217 B1 * | 9/2001 | Dassoulas et al. | 30/392 |
| 7,363,713 B2 * | 4/2008 | Hirabayashi et al. | 30/392 |
| 7,996,996 B2 * | 8/2011 | Hirabayashi | 30/392 |
| 8,407,902 B2 * | 4/2013 | Naughton et al. | 30/393 |
| 2004/0255475 A1 | 12/2004 | Hirabayashi et al. | |
| 2010/0162579 A1 * | 7/2010 | Naughton | B23D 49/11 30/392 |
| 2011/0226500 A1 * | 9/2011 | Furusawa et al. | 173/110 |

* cited by examiner

RECIPROCATING POWER TOOL

BACKGROUND OF THE INVENTION

Field of the Invention

The invention relates to a vibration reducing technique for a reciprocating power tool, such as a reciprocating saw and a jig saw, which performs a cutting operation on a workpiece by reciprocating a tool bit.

Description of the Related Art

Japanese non-examined laid-open Patent Publication No. 2005-14111 discloses a reciprocating saw in which, when a slider with a tool bit reciprocates via a crank by a motor in order to perform a cutting operation by the tool bit, a counter weight reciprocates to opposite to a slider. Specifically, the counter weight is caused to linearly move in a direction opposite to the slider, so that vibration caused by reciprocating motion of the slider is reduced.

According to the vibration reducing method for the reciprocating saw in which the counter weight reciprocates in a phase opposite to linear reciprocating motion of the slider, the momenta of the slider and the counter weight which mainly includes inertial force can cancel each other out in the longitudinal direction of the slider, so that vibration reduction can be rationally realized. However, vibration is caused by collision when the counter weight reverses its direction of movement, and energy loss is caused by the reversal of direction. In this respect, further improvement is desired.

SUMMARY OF THE INVENTION

Accordingly, it is an object of the invention to reduce vibration by a counter weight that smoothly operates without causing linear reciprocating motion within a reciprocating power tool.

In order to solve the above-described problem, according to a preferred embodiment of the invention, a reciprocating power tool which performs a predetermined operation on a workpiece by reciprocating a tool bit in its longitudinal direction includes an output shaft that is driven by a motor, a pinion provided on the output shaft, a first bevel gear which is engaged with the pinion and rotationally driven around an axis extending transversely to the longitudinal direction of the tool bit, a crank to which the first bevel gear is fixedly mounted and which converts rotation of the first bevel gear into linear motion, and a slider which holds the tool bit and is caused to linearly reciprocate in the longitudinal direction of the tool bit via linear motion of the crank. The "reciprocating power tool" in the invention includes power tools for use in operations on various kinds of workpieces, such as woodwork, metalwork and stonework, and it also widely includes various kinds of power tools for use in operations of cutting the workpiece, such as a reciprocating saw and a jig saw. Further, the "crank" in the invention typically includes a rotating shaft to which the first bevel gear is fixedly mounted, an eccentric pin which is disposed in a position displaced a predetermined distance from a rotation axis of the rotating shaft, and a crank plate which connects the rotating shaft and the eccentric pin to each other.

According to the preferred embodiment of the invention, the reciprocating power tool is characterized in that it further includes a second bevel gear that is opposed to the first bevel gear on the same axis as a rotation axis of the first bevel gear and engaged with the pinion so as to be rotationally driven in a direction opposite to the first bevel gear, a first counter weight that is disposed in a position displaced a predetermined distance from the rotation axis of the first bevel gear and rotates together with the first bevel gear, and a second counter weight that is disposed in a position displaced a predetermined distance from the rotation axis of the second bevel gear and rotates together with the second bevel gear. When the first counter weight and the second counter weight revolve around the rotation axis of the first bevel gear, components of the revolving motion in the longitudinal direction of the tool bit move opposite to linear motion of the slider. Further, the first counter weight and the second counter weight move in the same phase in the longitudinal direction of the tool bit and are disposed on opposite sides of the rotation axis and at the same distance from the rotation axis in a direction transverse to the longitudinal direction of the tool bit.

Further, the manner of providing the "first counter weight which rotates together with the first bevel gear" in the invention suitably includes the manner of providing the first counter weight on the first bevel gear and the manner of providing the first counter weight on the crank which rotates together with the first bevel gear. The manner of providing the "first counter weight" in the invention suitably includes the manner of forming the first counter weight as a separate member and mounting it to the first bevel gear or the crank, and the manner of integrally forming the first counter weight with the first bevel gear or the crank. Similarly, the manner of providing the "second counter weight" in the invention suitably includes the manner of forming the second counter weight as a separate member and mounting it to the second bevel gear, and the manner of integrally forming the second counter weight with the second bevel gear.

According to the invention, when the first counter weight and the second counter weight revolve around the rotation axis of the crank, the momenta of components of the revolving movement in the longitudinal direction of the tool bit (components in the back-and-forth direction where the longitudinal direction of the tool bit is taken as the horizontal direction) oppose the linear momentum of the slider, so that vibration caused by linear reciprocating motion of the slider can be reduced. As for the direction transverse to the longitudinal direction of the tool bit (the lateral direction where the longitudinal direction of the tool bit is taken as the horizontal direction), the momenta of the first counter weight and the second counter weight which revolve in opposite directions cancel each other out, so that unnecessary vibration is not caused.

As described above, according to the invention, vibration can be reduced by smooth operation utilizing rotation of the first and second counter weights. Thus, unlike the prior art technique of reducing vibration by linear reciprocating motion of the counter weight, problems such as that vibration may be caused by collision when the counter weight reverses its direction of movement and energy loss may be caused by the reversal of direction can be solved.

According to a further embodiment of the reciprocating power tool of the invention, the motor is disposed such that its rotation axis extends in parallel to the longitudinal direction of the tool bit. With such a construction, the reciprocating power tool can be provided which is reduced in size in a direction transverse to the longitudinal direction of the tool bit.

According to a further embodiment of the reciprocating power tool of the invention, the first bevel gear and the second bevel gear have the same number of teeth. With such a construction, a simply-structured counter weight mechanism can be rationally realized in which the first and second counter weights are caused to move in synchronized timing with respect to each other when the first and second counter weights are caused to revolve around the rotation axis of the crank via the first bevel gear and the second bevel gear.

According to a further embodiment of the reciprocating power tool of the invention, the first bevel gear and the second bevel gear are formed by different methods. The first bevel gear which is used to drive the slider is subjected to heavier load than the second bevel gear which is used to drive the second counter weight. Therefore, preferably, the first bevel gear is formed, for example, by machining or cutting in which a material having higher strength is used, while the second bevel gear which is subjected to lighter load than the first bevel gear is formed, for example, by sinter forming in which the bevel gear can be easily and economically manufactured. In this manner, the bevel gears can be designed to have comparable durability.

According to a further embodiment of the reciprocating power tool of the invention, the second bevel gear is disposed between the first bevel gear and the slider in a direction of the rotation axis of the second bevel gear. With such a construction, the reciprocating power tool can be provided in which the slider is disposed outside both of the bevel gears.

According to a further embodiment of the reciprocating power tool of the invention, the second bevel gear is disposed between the output shaft and the slider in a direction of the rotation axis of the second bevel gear. With such a construction, the counter weight can be disposed close to the slider.

According to a further embodiment of the reciprocating power tool of the invention, the reciprocating power tool has a power transmitting part for transmitting linear motion of the crank to the slider, and the slider which is driven to reciprocate in the longitudinal direction of the tool bit is supported on opposite sides of the power transmitting part in a driving direction. With such a construction, stability of reciprocating motion of the slider can be achieved.

According to a further embodiment of the reciprocating power tool of the invention, the crank has a rotating shaft which rotates together with the first bevel gear, an eccentric pin which is disposed in a position displaced a predetermined distance from the rotation axis of the rotating shaft, and a crank plate which is provided on one end of the rotating shaft in its longitudinal direction and connects the rotating shaft and the eccentric pin to each other. The first counter weight is mounted on the crank plate. Further, the second bevel gear is disposed on the crank plate side of the rotating shaft, and the second counter weight is disposed on a surface of the second bevel gear which faces the first counter weight. With such a construction, the first counter weight and the second counter weight can be disposed close to each other in the direction of the rotation axis of the crank. As a result, couple imbalance is reduced in a direction transverse to the longitudinal direction of the crank, so that unnecessary vibration can be effectively prevented.

According to a further embodiment of the reciprocating power tool of the invention, the first counter weight is fitted onto the eccentric pin and fastened to the crank plate at a position apart from the fitted part. By provision of this construction, the eccentric pin can be rationally used as a member for preventing the counter weight from rotating with respect to the crank plate.

According to a further embodiment of the reciprocating power tool of the invention, the crank has a rotating shaft which rotates together with the first bevel gear, an eccentric pin which is disposed in a position displaced a predetermined distance from the rotation axis of the rotating shaft, and a crank plate which is provided on one end of the rotating shaft in its longitudinal direction and connects the rotating shaft and the eccentric pin to each other. The first bevel gear is fixedly mounted onto the rotating shaft and the rotating shaft is rotatably supported on opposite sides of the first bevel gear by the bearings. With such a construction, the first bevel gear which is acted upon by load torque during operation can be supported with stability, so that it can smoothly rotate.

According to a further embodiment of the reciprocating power tool of the invention, the reciprocating power tool has a swinging driving part by which the slider holding the tool bit is caused to swing in a direction transverse to the longitudinal direction, in addition to being caused to reciprocate in the longitudinal direction by the crank. With such a construction, the tool bit held by the slider can be caused to simultaneously perform reciprocating motion in the longitudinal direction and swinging motion in a direction transverse to the direction of the reciprocating motion. Therefore, by application of the invention, for example, to a reciprocating saw, the tool bit in the form of the blade can be caused to move in an ellipse or perform orbital motion by a combination of reciprocating motion and swinging motion, so that cutting efficiency can be enhanced.

Further, the "swinging driving part" in the invention suitably includes those of the type which transmits swinging motion to the slider by using a cam mechanism and the type which transmits swinging motion to the slider by using a crank mechanism.

According to the invention, a technique for reducing vibration by a counter weight which smoothly operates without causing linear reciprocating motion is provided in a reciprocating power tool.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved reciprocating power tools and method for using such reciprocating power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

A representative embodiment of the invention is now described with reference to FIGS. 1 to 5. In this embodiment, a reciprocating saw 101 is explained as a representative example of a reciprocating power tool according to the invention. FIG. 1 is a sectional plan view showing the entire structure of the reciprocating saw 101 according to this embodiment. FIGS. 2 and 3 are longitudinal sectional views showing the entire structure of the reciprocating saw 101. In FIG. 2, a slider 107 is shown located at the end of forward movement (to the left as viewed in FIG. 2), and in FIG. 3, the slider 107 is shown located at the end of rearward movement (to the right as viewed in FIG. 3). FIG. 4 is an enlarged sectional view showing an essential part of the reciprocating saw 101 according to the invention and FIG. 5 is a view illustrating movement of counter weights 143, 145.

As shown in FIGS. 1 to 3, the reciprocating saw 101 according to this embodiment mainly includes a power tool body in the form of a body 103 that forms an outer shell of the reciprocating saw 101, a blade 111 that is detachably mounted to a chuck 109 on a front end of the slider 107 protruding from the body 103 and performs a cutting operation on a workpiece (not shown), and a handgrip 105 that is integrally formed on a rear end of the body 103 on the side opposite to the blade 111. The blade 111 is a feature that corresponds to the "tool bit" according to the invention.

The body 103 includes a motor housing 103a that houses a driving motor 113 and a gear housing 103b that houses a motion converting mechanism 121. The motion converting mechanism 121 converts rotating output of the driving motor 113 into linear motion and then transmits it to the slider 107. Further, for the sake of convenience of explanation, the blade 111 side (the left as viewed in FIGS. 1 to 3) is taken as the front, and the handgrip 105 side (the right as viewed in FIGS. 1 to 3) as the rear.

The driving motor 113 is disposed within the motor housing 103a. When the user depresses a trigger 115 on the handgrip 105, an electric switch 115a is turned on and the driving motor 113 is driven. The blade 111 then linearly reciprocates in its longitudinal direction (back-and-forth direction) together with the slider 107 and the chuck 109 and can perform a cutting operation on the workpiece.

The slider 107 is disposed in an upper region of an internal space of the gear housing 103b when the longitudinal direction of the blade 111 is taken as a horizontal direction, and the slider 107 is supported by front and rear bearings 108a, 108b such that it can reciprocate in its longitudinal direction (the longitudinal direction of the blade 111). Further, the slider 107 is connected to a motor shaft 117 via the motion converting mechanism 121 within the gear housing 103b. The driving motor 113 is disposed substantially right below an extension of the longitudinal axis of the blade 111 such that the longitudinal direction of the motor shaft 117 is parallel to the longitudinal direction of the blade 111. The driving motor 113 and the motor shaft 117 are features that correspond to the "motor" and the "output shaft", respectively, according to the invention.

The motion converting mechanism 121 serves to convert rotation of the motor shaft 117 into linear reciprocating motion in the longitudinal direction of the slider 107. Further, the motion converting mechanism 121 is disposed in a lower region of the internal space of the gear housing 103b, or substantially right below the slider 107, when the longitudinal direction of the blade 111 is defined as the horizontal direction. The motion converting mechanism 121 mainly includes a driving bevel gear 123 that rotates in a horizontal plane, a crank 129 and a slider block 131. The driving bevel gear 123 is a feature that corresponds to the "first bevel gear" according to the invention.

The crank 129 includes a crank shaft 129a that extends in a vertical direction transverse to the longitudinal direction of the blade 111, a crank plate 129b that is integrally formed on one end (upper end) in the longitudinal direction of the crank shaft 129a and an eccentric pin 129c that is disposed on an upper surface of the crank plate 129b in a position displaced a predetermined distance from a center of rotation of the crank plate 129b. The crank shaft 129a is a feature that corresponds to the "rotating shaft" according to the invention. The crank shaft 129a is disposed substantially right below the slider 107 and rotatably supported in the gear housing 103b by a dual-support structure or particularly via upper and lower bearings 127a, 127b.

The driving bevel gear 123 is fixedly mounted onto an upper region (on the slider 107 side) of the crank shaft 129a, and teeth formed on a lower surface of the driving bevel gear 123 are engaged with a pinion 119 formed on a front end of the motor shaft 117, so that the driving bevel gear can rotate in the horizontal plane together with the crank shaft 129a. A lower end portion of the eccentric pin 129c is press-fitted into a pin mounting hole formed in the driving bevel gear 123 from above, and an upper end portion of the eccentric pin 129c is fitted into a guide groove 131a of a slider block 131 formed on a lower surface of the slider 107, via the bearing 133 from below. The guide groove 131a of the slider block 131 extends in the horizontal direction transverse to the longitudinal direction of the slider 107, or in the lateral direction, so that the eccentric pin 129c can move together with the bearing 133 along the guide groove 131a with respect to the slider block 131.

Therefore, when the driving motor 113 is driven, the rotating output of the motor shaft 117 is transmitted to the crank shaft 129a via the driving bevel gear 123 which is engaged with the pinion 119. When the crank shaft 129a is rotationally driven, the eccentric pin 129c is caused to revolve around the rotation axis of the crank shaft 129a. At this time, components of the revolving motion of the eccentric pin 129c in a lateral direction transverse to the longitudinal direction of the slider 107 on a horizontal plane are allowed to escape into the guide groove 131a, and only components of the revolving motion in the longitudinal direction of the slider 107 are transmitted to the slider 107. As a result, the slider 107 is caused to linearly reciprocate only in its longitudinal direction. Further, a shoe 106 is provided on the front end of the body 103. During cutting operation, the shoe 106 is pressed against the workpiece with the handgrip 105 held by the user. The eccentric pin 129c and the guide groove 131a are features that correspond to the "power transmitting part" according to the invention.

A counter weight mechanism 141 is installed in the reciprocating saw 101 in order to reduce vibration which is caused in the longitudinal direction by linear reciprocating motion of the slider 107. The counter weight mechanism 141 is now explained. The counter weight mechanism 141 according to this embodiment mainly includes two counter weights 143, 145 that revolve in a horizontal plane around the rotation axis of the crank shaft 129a in opposite directions. One counter weight 143 is mounted on the upper surface of the driving bevel gear 123 and the other counter weight 145 is mounted on the lower surface of a counterrotating bevel gear 147 which is opposed to the driving bevel gear 123. The counterrotating bevel gear 147 is a feature that corresponds to the "second bevel gear" according to the invention. The driving-side counter weight 143 mounted on the driving bevel gear 123 and the counterrotating-side counter weight 145 mounted on the counterrotating bevel gear 147 are features that correspond to the "first counter weight" and the "second counter weight", respectively, according to the invention. Specifically, the counter weight mechanism 141 is formed by the two counter weights 143, 145 and the two bevel gears 123, 147 for driving the counter weights.

The counterrotating bevel gear 147 which is disposed on the opposite side of the pinion 119 (the motor shaft 117) from the driving bevel gear 123 is mounted onto a lower region of the crank shaft 129a via a bearing 149 such that it can rotate with respect to the crank shaft. Further, teeth formed on an upper surface of the counterrotating bevel gear 147 are engaged with the pinion 119 of the motor shaft 117. The driving-side counter weight 143 is fixedly mounted on the upper surface of the driving bevel gear 123 in a position displaced a predetermined distance from the rotation axis of the driving bevel gear. Further, the counterrotating-side counter weight 145 is fixedly mounted on the lower surface of the counterrotating bevel gear 147 in a position displaced a predetermined distance from the rotation axis of the counterrotating bevel gear. The driving-side and counterrotating-side counter weights 143, 145 have the same weight and the same contour, and the distances from the centers of gravity of the counter weights 143, 145 to the rotation axis of the bevel gears 123, 147 or the rotation axis of the crank shaft 129a are equal.

In this embodiment, the pinion 119 is used as a common part of the driving bevel gear 123 and the counterrotating bevel gear 147 which are opposed to each other. For this purpose, the teeth of the bevel gears are identically designed. The driving bevel gear 123 and the counterrotating bevel gear 147 are designed to have an equal number of teeth so that they are equal in reduction ratio. Thus, the driving bevel gear 123 and the counterrotating bevel gear 147 are caused to rotate on the same axis in opposite directions at the same speed. Therefore, the counter weights 143, 145 are caused to move in synchronized timing with respect to each other when the driving-side counter weight 143 and the counterrotating-side counter weight 145 revolve. Furthermore, the driving bevel gear 123 and the counterrotating bevel gear 147 are designed to be equal in module and pitch diameter. Thus, the conditions of engagement of the bevel gears 123, 147 with the pinion gear 119 are the same, so that the driving bevel gear 123 and the counterrotating bevel gear 147 can be designed to have comparable durability.

The counter weight mechanism 141 according to this embodiment is constructed as described above. Therefore, when the driving motor 113 is driven and the driving bevel gear 123 and the counterrotating bevel gear 147 are rotationally driven via the pinion 119, the driving-side counter weight 143 mounted on the driving bevel gear 123 and the counterrotating-side counter weight 145 mounted on the counterrotating bevel gear 147 revolve in opposite directions around the rotation axis of the crank shaft 129a.

In relation to the reciprocating motion of the slider 107 and the revolving motion of the driving-side and counterrotating-side counter weights 143, 145, positions to which the slider 107 and the counter weights 143, 145 move as far forward (toward the front of the reciprocating saw 101) as possible are defined as respective bottom dead points, and positions to which they move as far rearward (toward the rear of the reciprocating saw 101) as possible are defined as respective top dead points. In this embodiment, when the slider 107 moves to the bottom dead point, each of the driving-side and counterrotating-side counter weights 143, 145 moves to the top dead point (see FIGS. 2 and 4). Further, when the slider 107 moves to the top dead point, each of the driving-side and counterrotating-side counter weights 143, 145 moves to the bottom dead point (see FIG. 3).

Therefore, when the slider 107 moves, for example, from the bottom dead point to the top dead point, as shown by the arrow in FIG. 5, each of the driving-side and counterrotating-side counter weights 143, 145 revolves from the top dead point to the bottom dead point. The momentum of components of the revolving motion of each of the driving-side and counterrotating-side counter weights 143, 145 in the longitudinal direction of the blade 111 acts on the momentum of the slider 107 in such a manner as to cancel it out. With such a construction, vibration which is caused in the longitudinal direction or the back-and-forth direction by linear reciprocating motion of the slider 107 can be reduced. At this time, the resultant momentum of components of the revolving motion of the driving-side and counterrotating-side counter weights 143, 145 in the longitudinal direction of the blade 111 opposes the momentum of the slider 107. Further, FIG. 5 shows, by the solid line, the driving-side and counterrotating-side counter weights 143, 145 both placed in the top dead point.

As shown in FIG. 5, the driving-side and counterrotating-side counter weights 143, 145 revolve in opposite directions. Therefore, the momenta of lateral components of the revolving motion of the driving-side and counterrotating-side counter weights 143, 145 are equal in magnitude and opposite in direction. Therefore, in the lateral direction, the momenta of the driving-side and counterrotating-side counter weights 143, 145 cancel each other out so that unnecessary vibration can be prevented.

Second Embodiment of the Invention

A second embodiment of the invention is now explained with reference to FIGS. 6 to 9. FIG. 6 is a longitudinal sectional view showing an entire structure of the reciprocating saw 101 according to the second embodiment, and FIG. 7 is a sectional view showing an essential part of the reciprocating saw 101. FIG. 8 is a plan view showing a mounting structure of a driving-side counter weight 143, and FIG. 9 is a sectional view taken along line A-A in FIG. 8. This embodiment is a modification to the counter weight mechanism 141 for reducing vibration, and in the other points, it has the same construction as the above-described first embodiment. Therefore, components which are substantially identical to those in the first embodiment are given like numerals as in the first embodiment and are not described or only briefly described.

In this embodiment, the driving bevel gear 123 is mounted onto the lower region of the crank shaft 129a such that it rotates together with the crank shaft 129a, and teeth formed on the upper surface of the driving bevel gear 123 are engaged with the pinion 119 of the motor shaft 117. The counterrotating bevel gear 147 is mounted onto the upper region of the crank shaft 129a via the bearing 149 such that it can rotate with respect to the crank shaft, and teeth formed on the lower surface of the counterrotating bevel gear 147 are engaged with the pinion 119 of the motor shaft 117. In this manner, the driving bevel gear 123 and the counterrotating bevel gear 147 are opposed to each other on the opposite sides of the pinion 119 (the motor shaft 117). Therefore, the counterrotating bevel gear 147 rotates on the same axis in the opposite direction with respect to the driving bevel gear 123. Further, like in the first embodiment, the teeth of the driving bevel gear 123 and the counterrotating bevel gear 147 are identically designed, for example, in teeth number and module.

The counter weight mechanism 141 has the driving-side counter weight 143 and the counterrotating-side counter weight 145. In this embodiment, the driving-side counter weight 143 is mounted to the crank 129 which rotates together with the driving bevel gear 123.

The structure of mounting the driving-side counter weight 143 is explained in further details. As shown in FIGS. 8 and 9, the driving-side counter weight 143 is fixed on one end region of the upper surface of a plate-like weight support member 151 by fastening means 153 such as a rivet and a screw swage. The weight support member 151 is laid on one end surface in the longitudinal direction or upper surface of the crank plate 129b and fixed substantially in the center of the crank plate 129b by a screw 155. Further, the weight support member 151 has a pin hole 151a formed on the side opposite to the driving-side counter weight 143 and is fitted onto the eccentric pin 129c on the crank plate 129b via the pin hole 151a from above. Thus, the driving-side counter weight 143 is disposed in a position displaced a predetermined distance from the rotation axis of the crank shaft 129a, on an upper end region of the crank shaft 129a in the longitudinal direction.

The counterrotating-side counter weight 145 is mounted on the upper surface side of the counterrotating bevel gear 147 in a position displaced a predetermined distance from the rotation axis of the counterrotating bevel gear 147. Thus, in this embodiment, the driving-side counter weight 143 and the counterrotating-side counter weight 145 are disposed between the pinion 119 (the motor shaft 117) and the slider 107, and placed opposite each other on either side of the weight support member 151, so that they are closely located. Further, the counterrotating-side counter weight 145 is designed such that the momenta of lateral components of motion of the counterrotating-side counter weight 145 and the driving-side counter weight 143 cancel each other out by the relationship of the weight including at least the weight support member 151 and the radius of rotation.

The counter weight mechanism 141 according to this embodiment is constructed as described above. Therefore, when the driving motor 113 is driven and the slider 107 linearly reciprocates between the top and bottom dead points via the driving bevel gear 123 and the crank 129, the driving-side counter weight 143 and the counterrotating-side counter weight 145 revolve in opposite directions around the rotation axis of the crank shaft 129a at the same speed. The momentum of components of the revolving motion of each of the driving-side and counterrotating-side counter weights 143, 145 in the longitudinal direction of the blade 111 acts on the momentum of the slider 107 in such a manner as to cancel it out. With such a construction, vibration which is caused in the longitudinal direction or the back-and-forth direction by linear reciprocating motion of the slider 107 can be reduced.

Further, with the construction in which the driving-side counter weight 143 and the counterrotating-side counter weight 145 revolve in opposite directions, the momenta of lateral components of the revolving motion of the driving-side counter weight 143 and the counterrotating-side counter weight 145 are equal in magnitude and opposite in direction. Therefore, in the lateral direction, the momenta of the driving-side counter weight 143 and the counterrotating-side counter weight 145 cancel each other out, so that useless vibration can be prevented. In this manner, the second embodiment has the same effect as the above-described first embodiment.

Particularly, in this embodiment, with the construction in which the driving-side counter weight 143 and the counterrotating-side counter weight 145 are disposed on either side of the weight support member 151 between the pinion 119 and the slider 107, the counter weights 143, 145 can be closely disposed with a slight clearance therebetween such that they can avoid interference with each other in the direction of the rotation axis. Thus, couple imbalance can be reduced. Specifically, when the driving-side counter weight 143 and the counterrotating-side counter weight 145 revolve, opposite and parallel forces which act on the crank shaft 129a in directions (radial directions) transverse to the longitudinal direction of the crank shaft 129a, or moment of a couple is reduced. Thus, unnecessary vibration can be effectively prevented.

Further, in this embodiment, the crank shaft 129a is supported by the bearings 127a, 127b on the opposite sides of the driving bevel gear 123 for transmitting a driving force. With such a construction, the driving bevel gear 123 which is acted upon by load torque during operation can be supported with stability so that it can smoothly rotate.

Further, in this embodiment, the weight support member 151 is fixed substantially in the center of the crank plate 129b by the screw 155 and the pin hole 151a is fitted onto the eccentric pin 129c on the crank plate 129b. Specifically, in the structure of mounting the weight support member 151, the eccentric pin 129c on the crank plate 129b is utilized as a rotation preventing member. Therefore, even if the screw 155 works loose, the driving-side counter weight 143 is reliably rotated together with the crank plate 129b.

A modification to the timing of driving the driving-side and counterrotating-side counter weights 143, 145 is now explained. According to the above-described embodiments, the driving-side and counterrotating-side counter weights 143, 145 revolve in phase opposite to the reciprocating motion of the slider 107 to which the blade 111 is mounted, so that the momenta can be reduced and thus vibration can be reduced. In the reciprocating saw 101, however, in a load drive condition in which the blade 111 is actually used to cut a workpiece and a no-load drive condition in which the blade 111 is driven at idle without performing a cutting operation, the optimum timing of canceling vibration by the driving-side and counterrotating-side counter weights 143, 145 differs depending on the absence or presence of external resistance on the blade 111. In the load drive condition, the blade 111 is acted upon by cut resistance and the phase of the slider 107 which drives the blade 111 is more likely to be delayed than in the no-load drive condition by this cut resistance. Therefore, preferably, the timing of driving the driving-side and counterrotating-side counter weights 143, 145 is set with consideration given to such a driving pattern of the blade 111.

Accordingly, a phase difference between reciprocating motion of the slider 107 which drives the blade 111 and revolving motion of the driving-side and counterrotating-side counter weights 143, 145 is designed such that the timing to reach the top dead point is different from the timing to reach the bottom dead point. Specifically, the phase of revolving motion of the driving-side and counterrotating-side counter weights 143, 145 is set to be delayed more than 180 degrees with respect to the phase of reciprocating motion of the slider 107. In other words, with reference to the state of opposite phase in which a phase difference of 180 degrees exists between the reciprocating motion of the slider 107 and the revolving motion of the driving-side and counterrotating-side counter weights 143, 145, it is designed such that the revolving motion of the driving-side and counterrotating-side counter weights 143, 145 is delayed with respect to the reciprocating motion of the slider 107.

This is shown in a schematic diagram of FIG. 10. FIG. 10(A) shows revolving motion of the eccentric pin 129c of the crank 129 which causes the slider 107 to reciprocate, and FIG. 10(B) shows revolving motion of the driving-side and counterrotating-side counter weights 143, 145. As shown in the drawings, when the eccentric pin 129c is placed at the bottom dead point P1, the driving-side and counterrotating-side counter weights 143, 145 which revolve in opposite directions are designed to be delayed by a predetermined angle α with respect to the top dead point P2 which is opposite in phase. Assuming that a value of cut resistance is frequently seen during cutting operation on a workpiece, the delay angle α is defined as an angle corresponding to the assumed cut resistance value. For example, it is set to 15 degrees.

By setting the timing of motion of the driving-side and counterrotating-side counter weights 143, 145 as described above, rational vibration reducing measures can be taken in consideration of the cut resistance.

Third Embodiment of the Invention

The reciprocating saw 101 according to a third embodiment of the invention is now explained with reference to FIGS. 11 and 12. FIG. 11 is a longitudinal sectional view showing an entire structure of the reciprocating saw 101 according to the third embodiment, and FIG. 12 is a sectional view showing an essential part of the reciprocating saw 101. The reciprocating saw 101 according to this embodiment is constructed such that the slider 107 which holds the blade 111 is caused to perform not only linear reciprocating motion in the back-and-forth direction but also swinging motion in a vertical direction transverse to this linear reciprocating motion. Specifically, the blade 111 is caused to move in an ellipse or perform orbital motion by a combination of linear reciprocating motion and swinging motion.

An orbital mechanism which causes the slider 107 holding the blade 111 to perform orbital motion mainly includes the motion converting mechanism 121 which is formed mainly by the crank 129 for causing the slider 107 to linearly reciprocate in the longitudinal direction (the back-and-forth direction), and a cam mechanism 161 which causes the blade 111 to swing in the vertical direction transverse to the longitudinal direction. Further, the motion converting mechanism 121 has the same construction as the above-described first embodiment. Therefore, components which are substantially identical to those in the first embodiment are given like numerals as in the first embodiment and are not described or only briefly described. The cam mechanism 161 is a feature that corresponds to the "swinging driving part" according to the invention.

The slider 107 designed as a long member is supported by front and rear bearings 157, 159 such it can reciprocate in the longitudinal direction. The front one of the bearings 157 closer to the blade 111 includes a spherical slide bearing (spherical bush). The spherical slide bearing 157 supports the slider 107 such that the slider can slide. Further, the spherical slide bearing 157 includes an inner ring 157a and an outer ring 157b. The inner ring 157a slidably supports the slider 107 and has a spherical outer circumferential surface, and the outer ring 157b has a concave spherical inner circumferential surface which is fitted onto the outer circumferential surface of the inner ring 157a and can rotate with respect to the inner ring. The outer ring 157b is fixedly supported by the gear housing 103b. With such a construction, the slider 107 is allowed to swing in the vertical direction on the center of the spherical surface of the spherical slide bearing 157.

The cam mechanism 161 mainly includes an end face cam 163 that rotates together with the crank shaft 129a and serves to drive the rear one 159 of the two bearings for supporting the slider 107 which is remoter from the blade 111. The rear bearing 159 includes a slide bearing (bush). The end face cam 163 is disposed between the crank plate 129b and the slider 107 and configured as a short cylindrical element having a bottom, and an end face of a cylindrical part of the end face cam 163 which faces the slider 107 is designed as a cam face 163a. The end face cam 163 has a disc part 163b forming the bottom of the cylindrical element, and the disc part 163b is overlaid on top of the crank plate 129b and fastened by a screw 155. Further, the disc part 163b of the end face cam 163 has a pin hole which is fitted onto the eccentric pin 129c on the crank plate 129b. The end face cam 163 is positioned with respect to the crank 129 in the circumferential direction by fitting the pin hole onto the eccentric pin 129c.

The end face cam 163 is arranged such that the cam face 163a faces upward or faces the slider 107. The rear slide bearing 159 for supporting the slider 107 is held in contact with the cam face 163a via a cam follower 165. With such a construction, the slider 107 is caused to swing on the center of the spherical surface of the front spherical slide bearing 157 according to the amount of cam lift of the cam face 163a. The cam follower 165 disposed between the cam face 163a and the slide bearing 159 is formed by a roller bearing. Therefore, the cam face 163a is held in rolling contact with the cam follower 165, which is effective in wear reduction. Further, in order to realize reliable swinging motion of the slider 107 by preventing the cam follower 165 from jumping up from the cam face 163a, the cam follower 165 is constantly pressed against the cam face 163a by a biasing spring 167. The biasing spring 167 is disposed between an outer surface of the rear slide bearing 159 and an inner wall surface of the gear housing 103b.

Further, in the counter weight mechanism 141 according to this embodiment, the driving-side counter weight 143 is fixedly mounted on an upper surface of the disc part 163b of the end face cam 163, and in the other points, it has the same construction as the above-described second embodiment. Therefore, the counter weight mechanism 141 is given like numerals as in the second embodiment and is not described or only briefly described.

The reciprocating saw 101 according to this embodiment is constructed as described above. Therefore, when the driving motor 113 is driven and the slider 107 is caused to linearly reciprocate in the back-and-forth direction between the top dead point (rear position) and the bottom dead point (front position) via the driving bevel gear 123 and the crank 129, at the same time, the end face cam 153 which rotates together with the crank 129 is caused to rotate, and the slider 107 is caused to swing in the vertical direction on the center of the spherical surface of the spherical slide bearing 157 via the cam follower 165 which follows the cam face 163a of the end face cam 153. Therefore, the blade 111 held by the slider 107 moves in an ellipse or performs orbital motion together with the slider 107 by a combination of linear reciprocating motion in the back-and-forth direction and swinging motion in the vertical motion.

The cam face 163a of the end face cam 163 is designed such that the blade 111 moves forward from the rear position (the top dead position) in an upper half of the ellipse and returns rearward from the front position (the bottom dead position) in a lower half of the ellipse. Therefore, when the blade 111 returns rearward, the blade 111 moves in a direction in which it digs into the workpiece, so that the cutting efficiency is enhanced.

In this embodiment, power of the cam mechanism 161 is transmitted to a rear end of the slider 107 in the longitudinal direction. Therefore, the distance from the center of the sphere of the front spherical slide bearing 157 or the swinging center of the slider 107 to the power transmitting part can be made longer, so that setting of the amount of earn lift can be easily made. Further, by provision of the construction in which the cam follower 165 is formed by the roller bearing and held in rolling contact with the cam face 163a, wear of the contact surface can be reduced.

Further, in this embodiment, with the construction in which the slider 107 is supported by the spherical slide bearing 157, smooth and stable swinging motion of the slider 107 and the blade 111 held by the slider 107 can be ensured.

As for the other effects of the third embodiment, the same effects as the above-described second embodiment can be obtained. For example, vibration which is caused in the back-and-forth direction during operation of cutting a workpiece by the blade 111 can be reduced by the counter weight mechanism 141. Moment of a couple generated by revolving motion of the driving-side counter weight 143 and the counterrotating-side counter weight 145 is reduced, so that unnecessary vibration can be prevented.

Further, in the third embodiment, the cam mechanism 161 formed by the end face cam 163 is used as the swinging driving part which causes the slider 107 (the blade 111) to swing by converting rotation of the crank shaft 129a into reciprocating motion, but the swinging driving part may also be formed by using a cam other than the end face cam or a crank mechanism.

Further, in this embodiment, the driving-side and counterrotating-side counter weights 143, 145 are formed as separate members and mounted on respective associated members, i.e. the driving bevel gear 123, the counterrotating bevel gear 147 or the crank 129, but they may be integrally formed with the driving bevel gear 123, the counterrotating bevel gear 147 or the crank 129.

Further, in this embodiment, the counterrotating-side counter weight 145 is directly mounted on the counterrotating bevel gear 147, but it may be mounted on a rotating member which is rotationally driven by the counterrotating bevel gear 147 or a rotating member which rotates together with the counterrotating bevel gear 147.

Further, in this embodiment, the reciprocating saw 101 was explained as a representative example of the reciprocating power tool, but the invention can also be widely applied to other reciprocating power tools such as a jig saw which perform an operation on a workpiece by reciprocating movement of a tool bit.

DESCRIPTION OF NUMERALS

Figure 1:
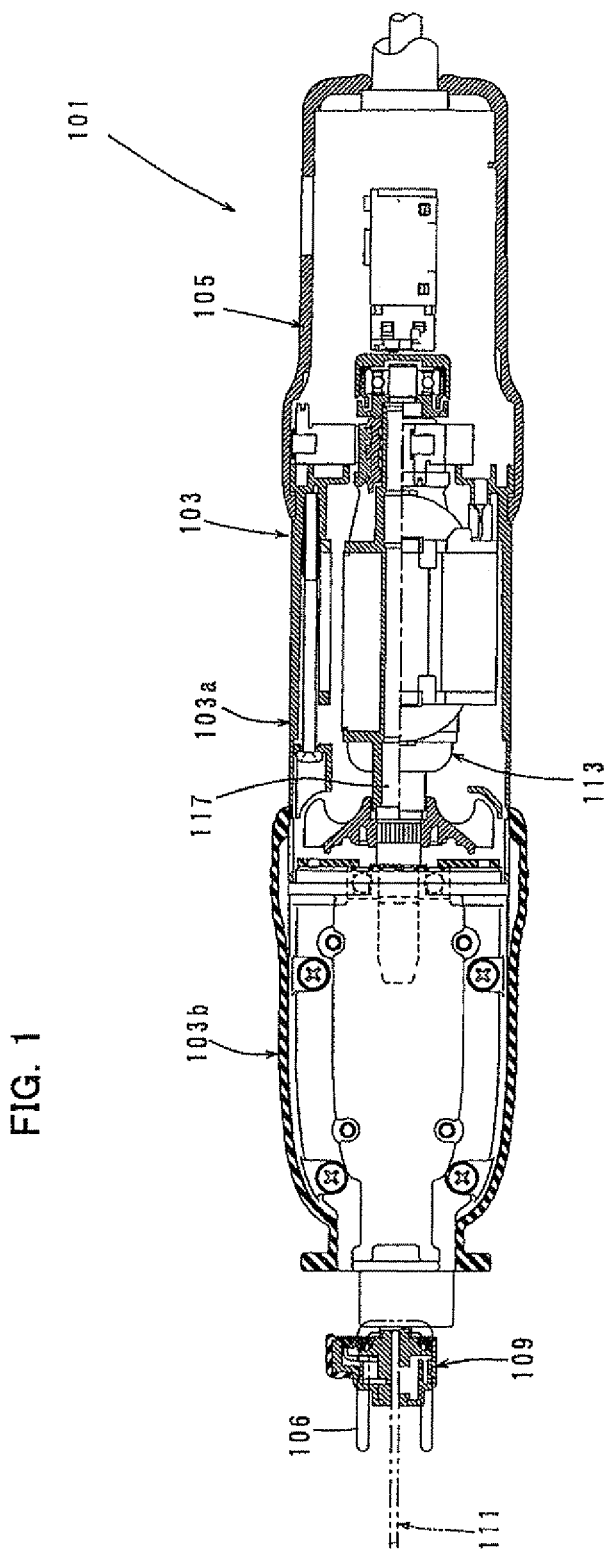
FIG. 1 is a sectional plan view showing the entire structure of a reciprocating saw according to a first embodiment of this invention.
Figure 2:
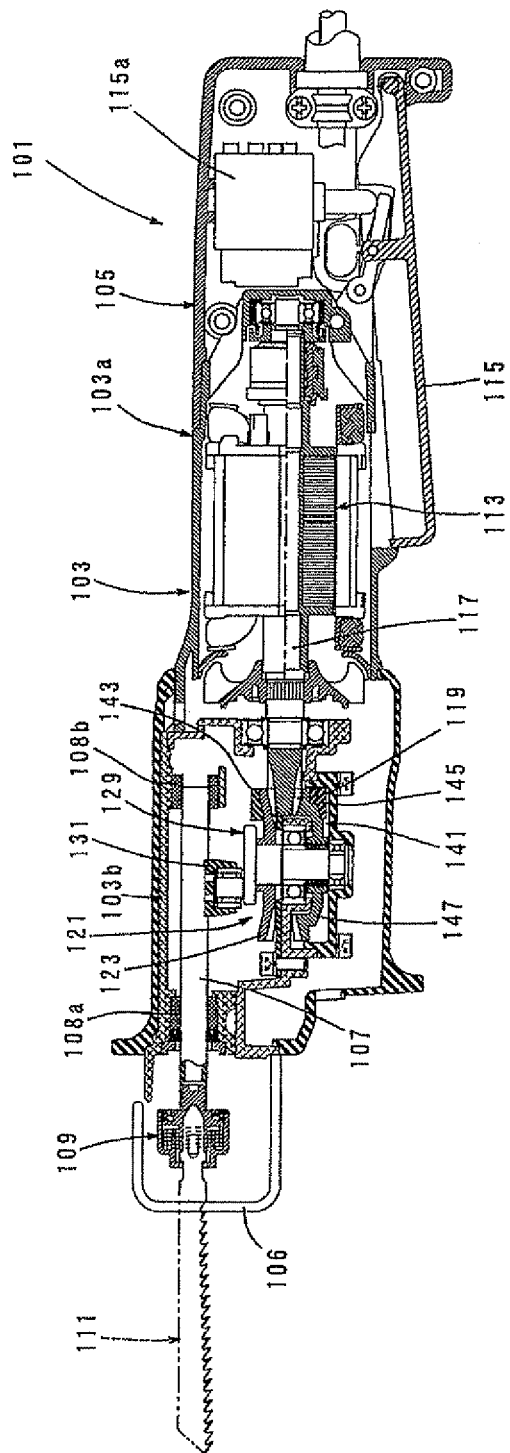
FIG. 2 is a longitudinal sectional view showing the entire reciprocating saw in the state in which a slider is located at the end of forward movement (to the left as viewed in FIG. 2).
Figure 3:
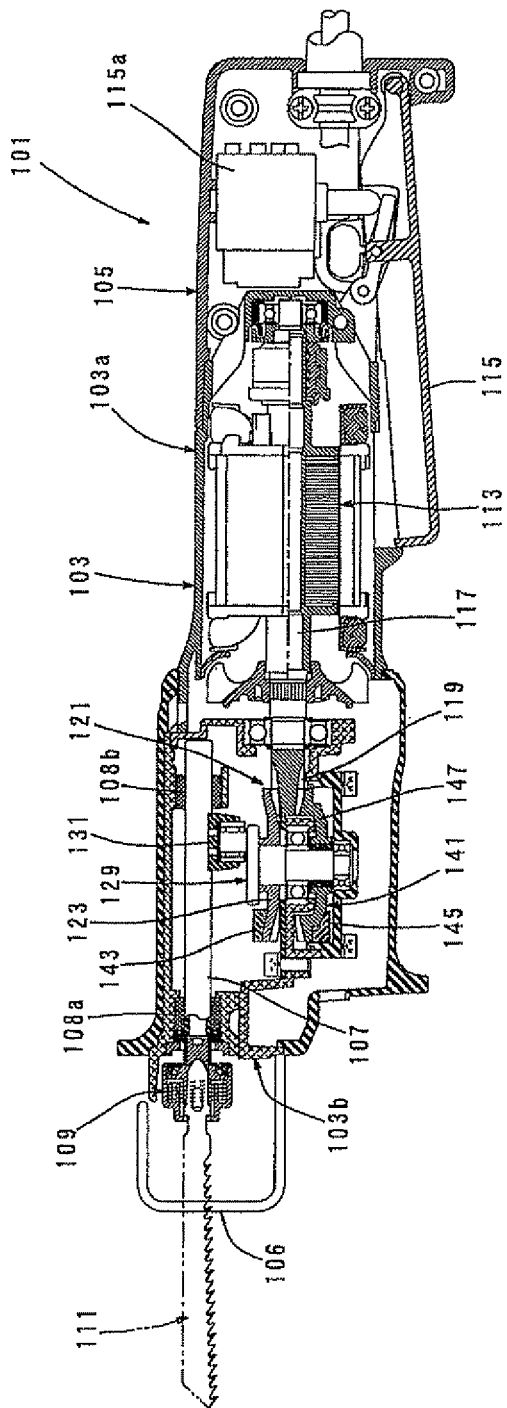
FIG. 3 is a longitudinal sectional view showing the entire reciprocating saw in the state in which the slider is located at the end of rearward movement (to the right as viewed in FIG. 3).
Figure 4:
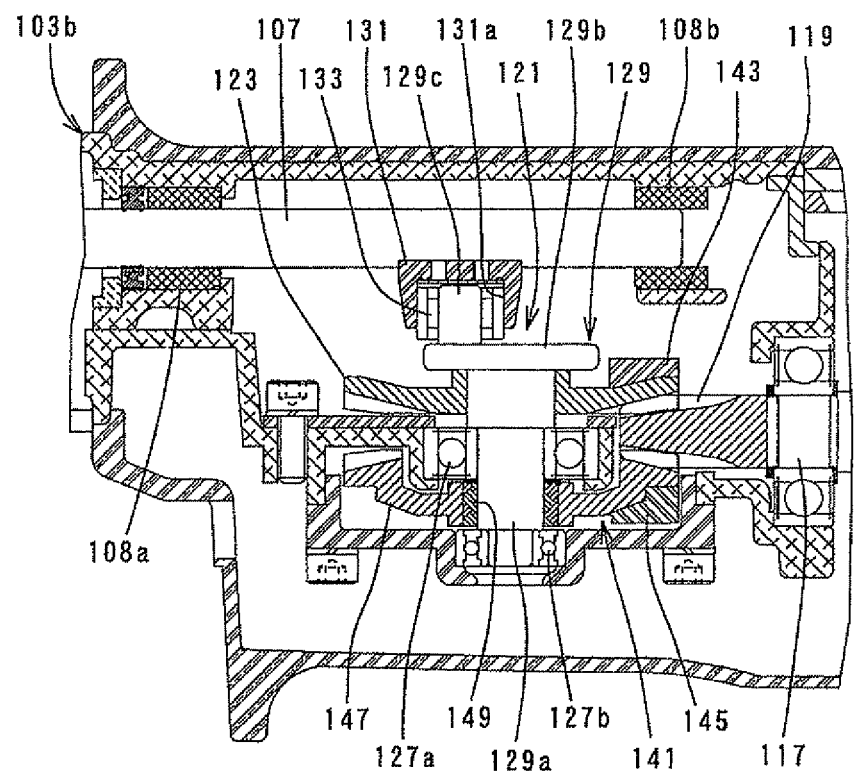
FIG. 4 is a sectional view showing an essential part of the reciprocating saw.
Figure 5:
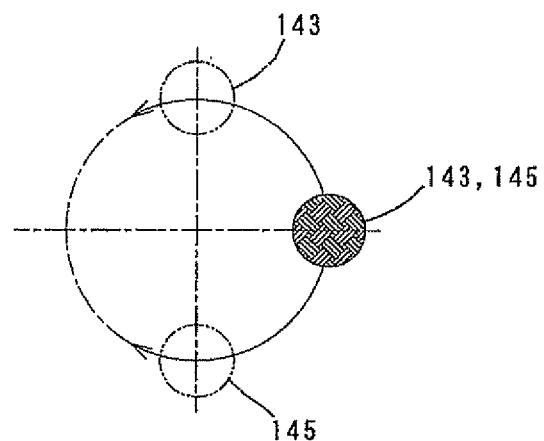
FIG. 5 is a view illustrating motion of a counter weight.
Figure 6:
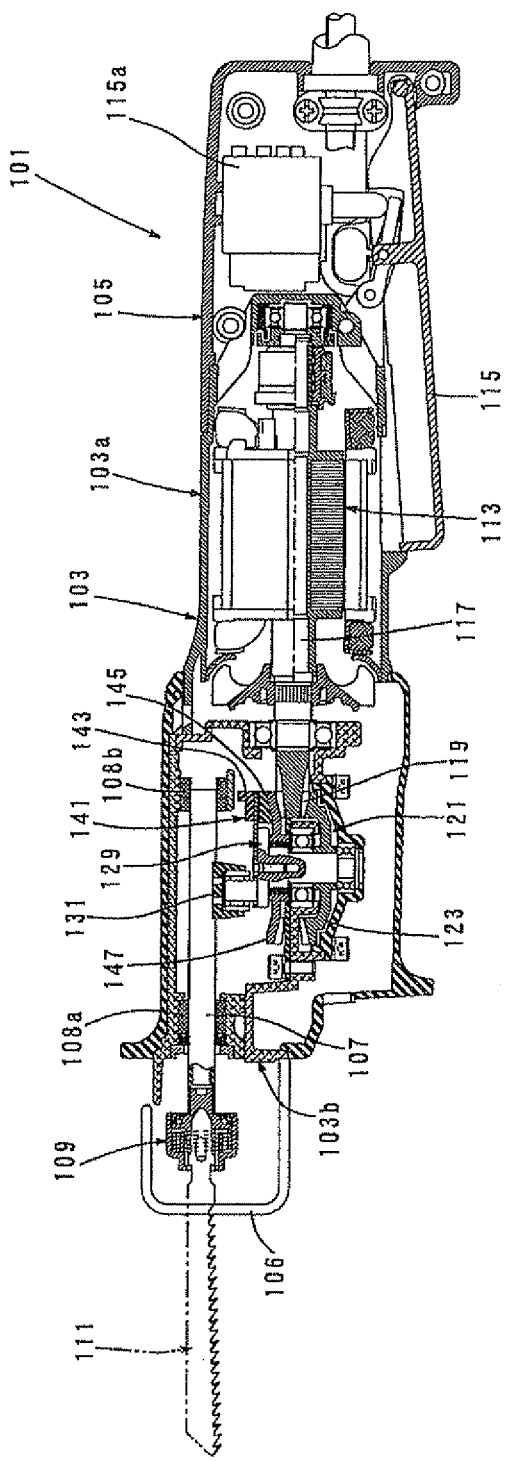
FIG. 6 is a longitudinal sectional view showing the entire structure of a reciprocating saw according to a second embodiment of this invention.
Figure 7:
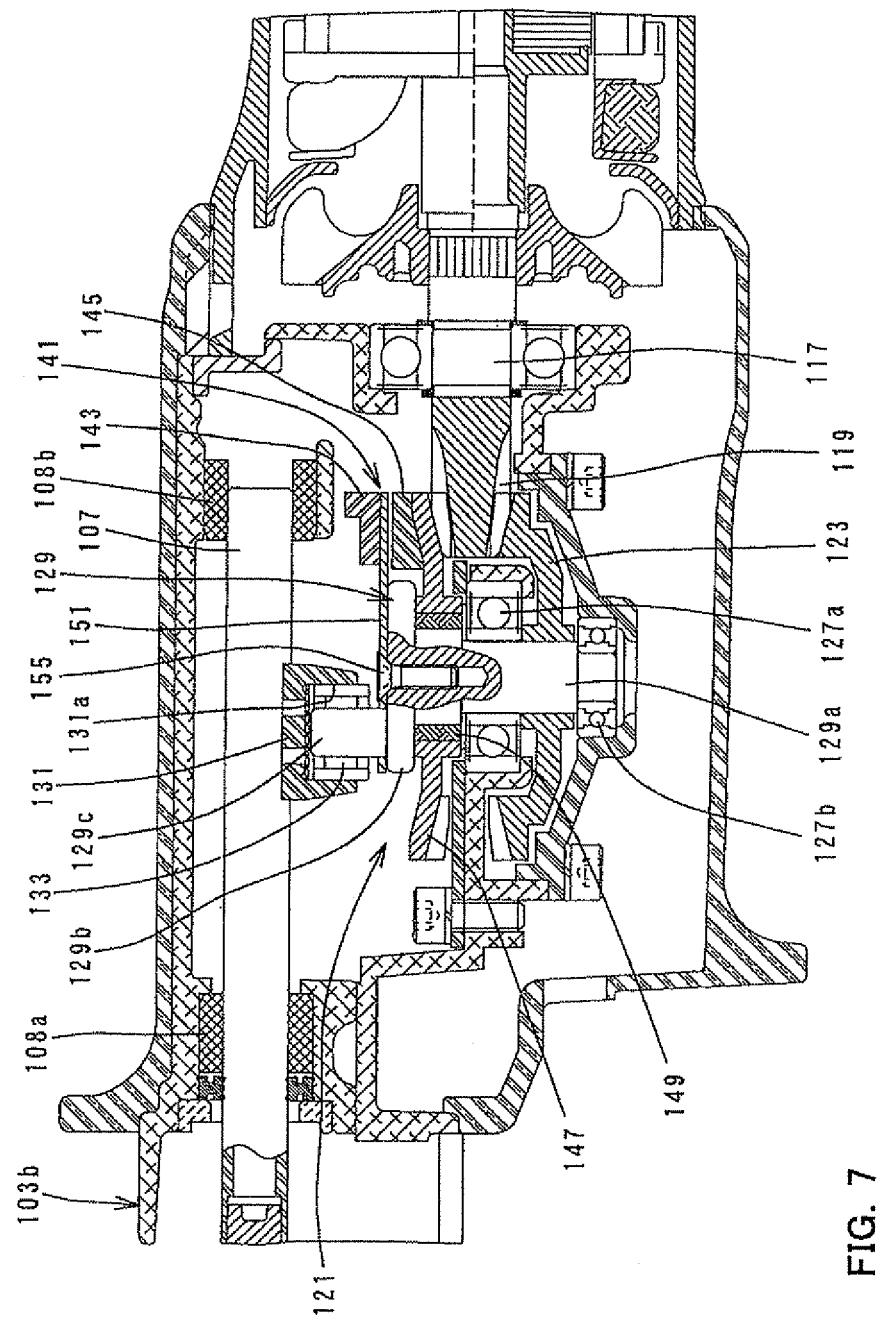
FIG. 7 is a sectional view showing the essential part of the reciprocating saw.
Figure 8:
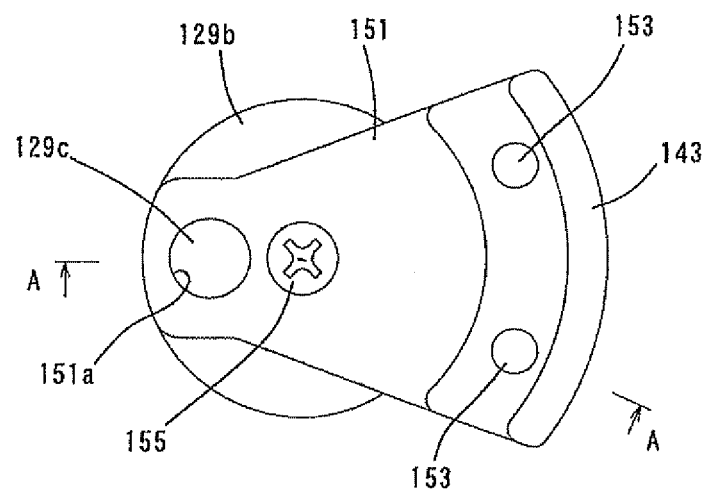
FIG. 8 is a plan view showing a structure of mounting a driving-side counter weight.
Figure 9:
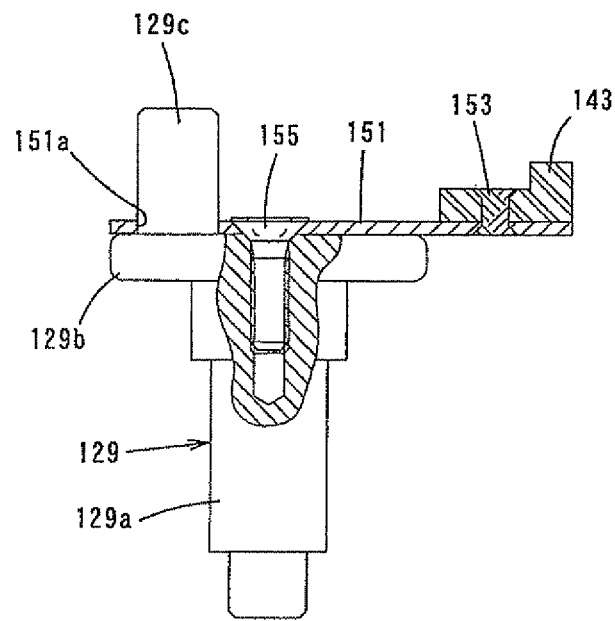
FIG. 9 is a sectional view taken along line A-A in FIG. 8.
Figure 10:
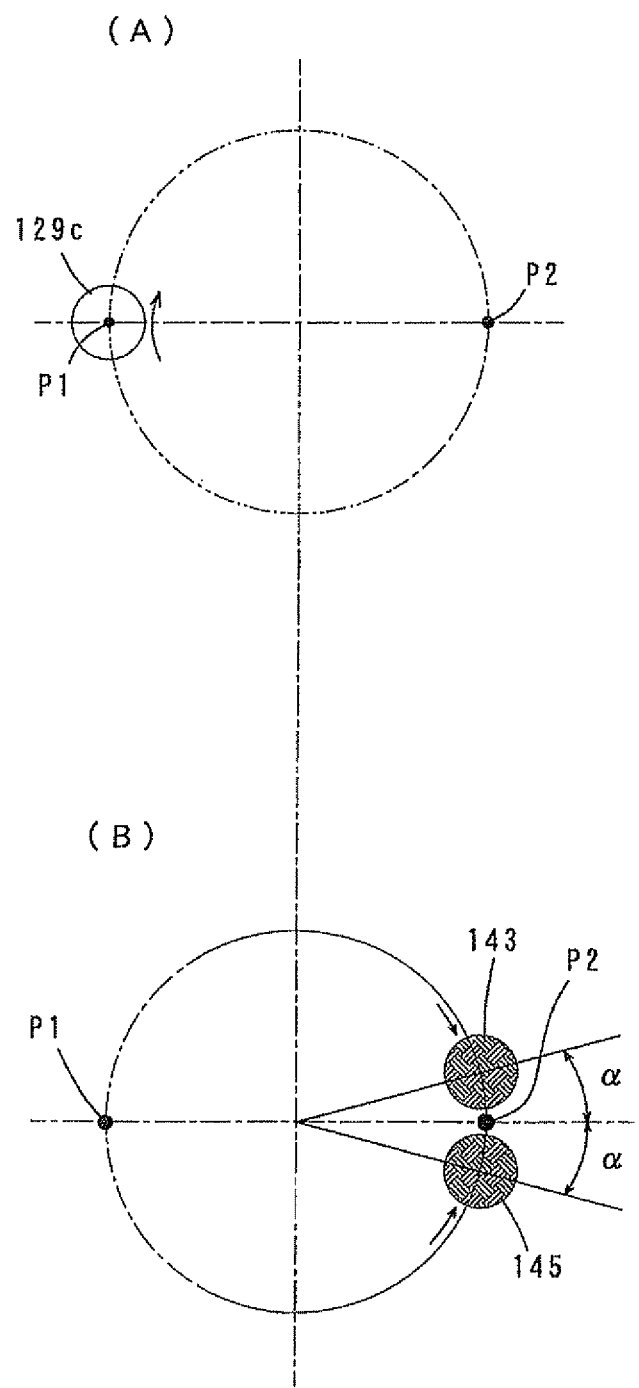
FIG. 10 is an illustration for illustrating phases of reciprocating motion of a slider and revolving motion of driving-side and counterrotating-side counter weights.
Figure 11:
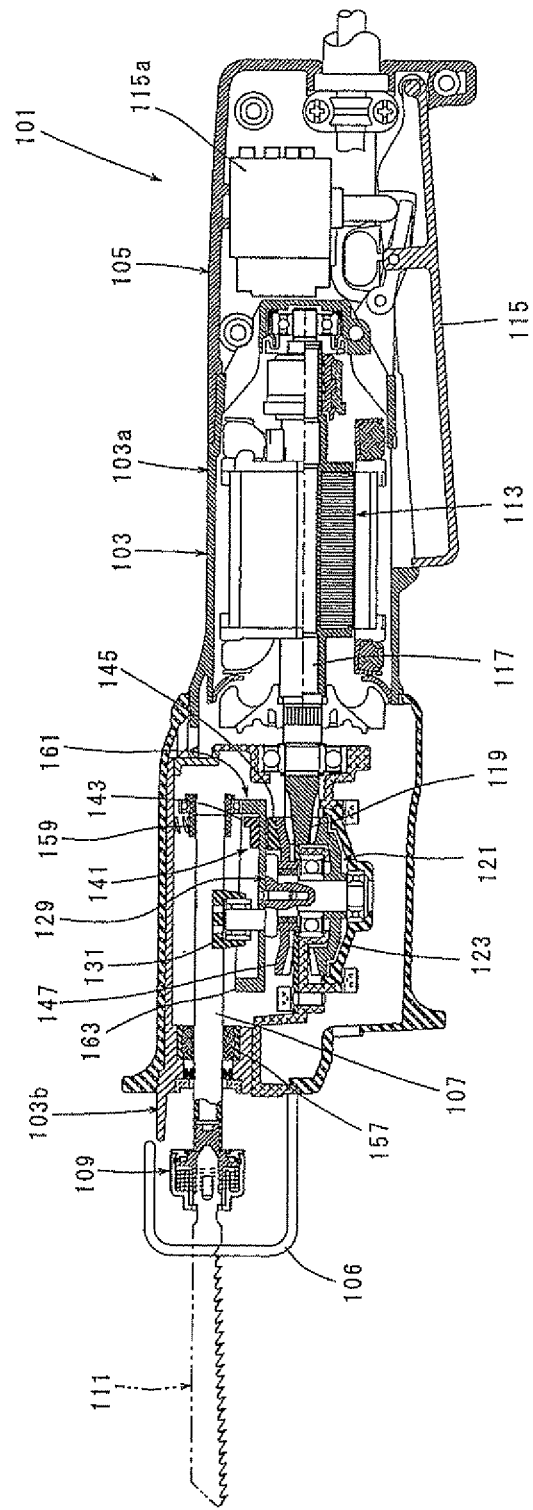
FIG. 11 is a longitudinal sectional view showing the entire structure of a reciprocating saw according to a third embodiment of this invention.
Figure 12:
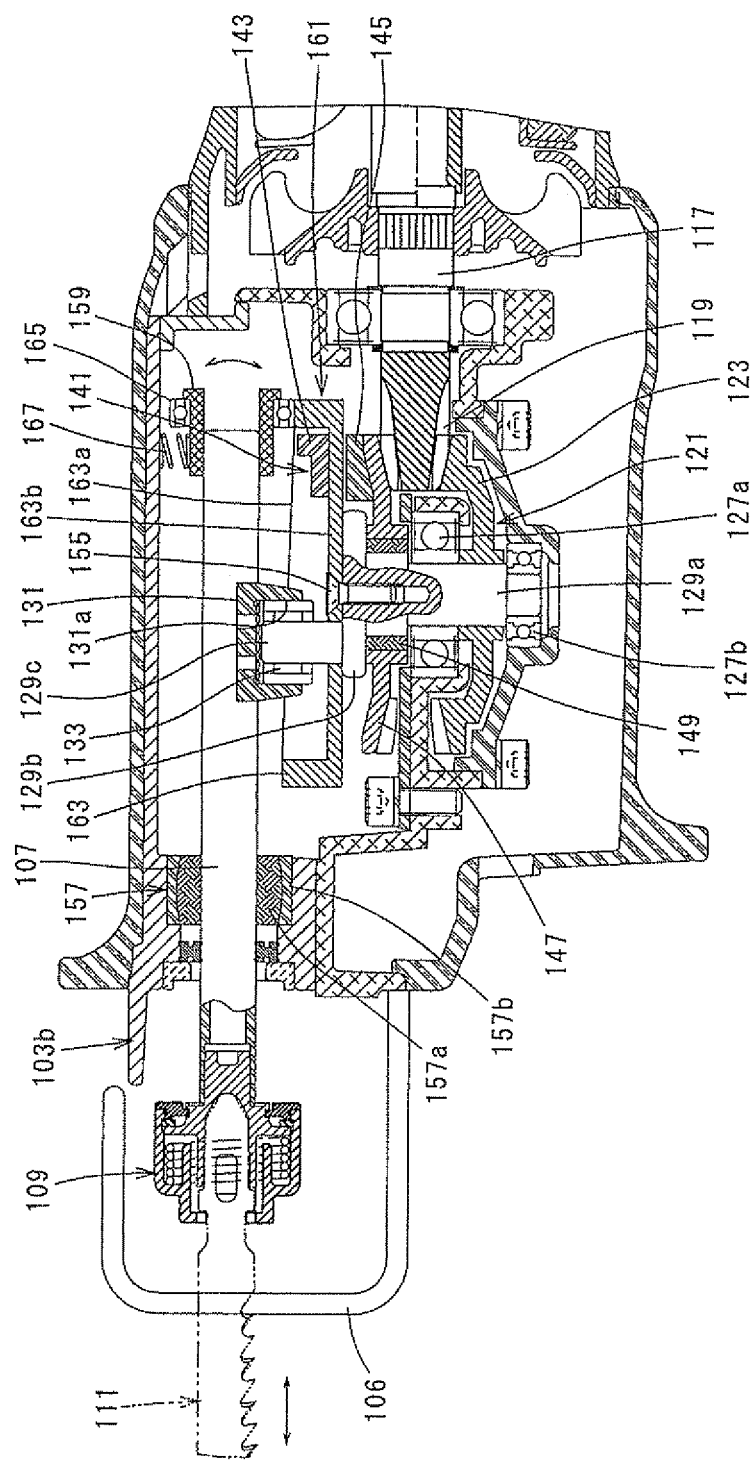
FIG. 12 is a sectional view showing the essential part of the reciprocating saw.

101 reciprocating saw (reciprocating power tool)
103 body
103a motor housing
103b gear housing
105 handgrip
106 shoe
107 slider
108a front bearing
108b rear bearing
109 chuck
111 blade
113 driving motor
115 trigger
115a electric switch
117 motor shaft (output shaft)
119 pinion
121 motion converting mechanism
123 driving bevel gear (first bevel gear)
127a upper bearing
127b lower bearing
129 crank
129a crank shaft (rotating shaft)
129b crank plate
129c eccentric pin
131 slider block
131a guide groove
133 bearing
141 counter weight mechanism
143 driving-side counter weight (first counter weight)
145 counterrotating-side counter weight (second counter weight)
147 counterrotating bevel gear (second bevel gear)
149 bearing
151 weight support member
151a pin hole
153 rivet
155 screw
157 spherical slide bearing
157a inner ring
157b outer ring
159 slide bearing 161 cam mechanism
163 end face cam
163a cam face
163b disc part
165 cam follower
167 biasing spring

What we claim is:

1. A reciprocating power tool, which performs a predetermined operation on a workpiece by reciprocating a tool bit in a longitudinal direction of the tool bit, comprising:
an output shaft that is driven by a motor,
a pinion that is provided on the output shaft,
a first bevel gear that is engaged with the pinion and rotationally driven around an axis extending transversely to the longitudinal direction of the tool bit,
a crank to which the first bevel gear is fixedly mounted and which converts rotation of the first bevel gear into linear motion,
a slider that holds the tool bit and is caused to linearly reciprocate in the longitudinal direction of the tool bit via linear motion of the crank,
a second bevel gear that is opposed to the first bevel gear on the same axis as a rotation axis of the first bevel gear and engaged with the pinion so as to be rotationally driven in a direction opposite to the first bevel gear,
a first counter weight that is disposed in a position displaced a predetermined distance from the rotation axis of the first bevel gear and rotates together with the first bevel gear, and
a second counter weight that is disposed in a position displaced a predetermined distance from the rotation axis of the second bevel gear and rotates together with the second bevel gear, wherein:
the first counter weight is mounted on the crank via the first bevel gear and the second counter weight is mounted on the crank via the second bevel gear,
the first counter weight and the second counter weight are on opposite sides of the pinion,
when the first counter weight and the second counter weight revolve around the rotation axis of the first bevel gear, components of the revolving motion of the first and second counter weights in the longitudinal direction of the tool bit move opposite to a linear motion of the slider, and the first counter weight and the second counter weight move in a same phase in the longitudinal direction of the tool bit with respect to each other and are disposed on opposite sides of said rotation axis at substantially a same distance from the rotation axis in a direction transverse to the longitudinal direction of the tool bit,
the crank has a rotating shaft which rotates together with the first bevel gear, an eccentric pin which is disposed in a position displaced a predetermined distance from the rotation axis of the rotating shaft, and a crank plate which is provided on one end of the rotating shaft in its longitudinal direction and connects the rotating shaft and the eccentric pin to each other,
the first counter weight is mounted to the crank plate, the second bevel gear is disposed on a crank plate side of the rotating shaft, and the second counter weight is disposed on a surface of the second bevel gear which faces the first counter weight,
the first and second counterweights are respectively disposed at the circumferential edge of the first and second bevel gears and are respectively disposed on surfaces of the first and second bevel gears that face away from each other, and
inner radial surfaces of the first counter weight and the second counter weight are completely located outside of an outer radial surface of the crank relative to the rotation axis of the rotating shaft.

2. The reciprocating power tool as defined in claim 1, wherein the motor is disposed such that its rotation axis extends substantially in parallel to the longitudinal direction of the tool bit.

3. The reciprocating power tool as defined in claim 1, wherein the first bevel gear and the second bevel gear have the same number of teeth.

4. The reciprocating power tool as defined in claim 1, wherein the second bevel gear is disposed between the first bevel gear and the slider in a direction of the rotation axis of the second bevel gear.

5. The reciprocating power tool as defined in claim 2, wherein the second bevel gear is disposed between the output shaft and the slider in a direction of the rotation axis of the second bevel gear.

6. The reciprocating power tool as defined in claim 1, comprising a power transmitting part for transmitting linear motion of the crank to the slider, wherein the slider which is driven to reciprocate in the longitudinal direction of the tool bit is supported on both opposing sides of the power transmitting part in a driving direction.

7. The reciprocating power tool as defined in claim 1, wherein the first bevel gear is fixedly mounted onto the rotating shaft and the rotating shaft is rotatably supported on opposite sides of the first bevel gear by bearings.

8. The reciprocating power tool as defined in claim 1, comprising a swinging driving part by which the slider holding the tool bit is caused to swing in a direction transverse to the longitudinal direction, in addition to being caused to reciprocate in the longitudinal direction by the crank.

9. The reciprocating power tool as defined in claim 1, wherein
the first counter weight is directly mounted to and in contact with a cam mechanism, and
the cam mechanism is mounted on the crank plate.

10. The reciprocating power tool as defined in claim 1, wherein the first and second counter weights are disposed opposite from each other with respect to a centerline of the output shaft.

* * * * *